United States Patent [19]

Katayama et al.

[11] Patent Number: 4,679,494
[45] Date of Patent: Jul. 14, 1987

[54] DAMPER DEVICE FOR AN AIR CONDITIONING APPARATUS

[75] Inventors: Kaneo Katayama, Yaizu; Yasuhiko Hashimoto, Fujieda, both of Japan

[73] Assignee: Mitsubishi Denki Kabushiki Kaisha, Tokyo, Japan

[21] Appl. No.: 799,103

[22] Filed: Nov. 18, 1985

[30] Foreign Application Priority Data

Nov. 27, 1984 [JP] Japan .............................. 59-179615[U]
Jun. 5, 1985 [JP] Japan .............................. 60-84787[U]

[51] Int. Cl.⁴ .............................................. F24F 1/02
[52] U.S. Cl. ..................................... 98/38.6; 98/41.1; 251/294; 251/366
[58] Field of Search .......................... 62/410, 411, 412; 98/31.6, 34.6, 38.6, 38.7, 38.9, 41.1; 251/294, 298, 366

[56] References Cited

U.S. PATENT DOCUMENTS

| | | | |
|---|---|---|---|
| 1,777,848 | 10/1930 | Harnett | 98/38.6 X |
| 1,788,823 | 1/1931 | Callahan | 98/38.9 X |
| 2,434,847 | 1/1948 | Hagen | 98/38.6 X |
| 4,524,588 | 6/1985 | Bond | 62/262 |
| 4,553,405 | 11/1985 | Hapolitano et al. | 62/410 X |

FOREIGN PATENT DOCUMENTS

| | | | |
|---|---|---|---|
| 127911 | 6/1948 | Australia | 251/298 |
| 1147635 | 4/1969 | United Kingdom . | |

*Primary Examiner*—Harold Joyce
*Attorney, Agent, or Firm*—Oblon, Fisher, Spivak, McClelland & Maier

[57] ABSTRACT

A duct with a damper is provided in an air conditioning apparatus to adjust an air flow rate. A slit is formed in the duct to be opened in a side wall. The damper comprises an opening and closing part inserted in the duct through the slit and a pivotal shaft which is turnably held by the duct. This construction facilitates easy connection of the damper to the duct. The damper undergoes opening and closing movement by a cable. The cable is fixed to a given position in the air conditioning apparatus by forming an engaging part at an end portion of the cable and by forming another engaging part in a cable supporting part for supporting cable at a position corresponding to the first engaging part so as to engage the two engaging parts.

6 Claims, 10 Drawing Figures

DAMPER DEVICE FOR AN AIR CONDITIONING APPARATUS

The present invention relates to a damper device for an air conditioning apparatus provided with a damper for adjusting an air flow rate.

Figure 9:
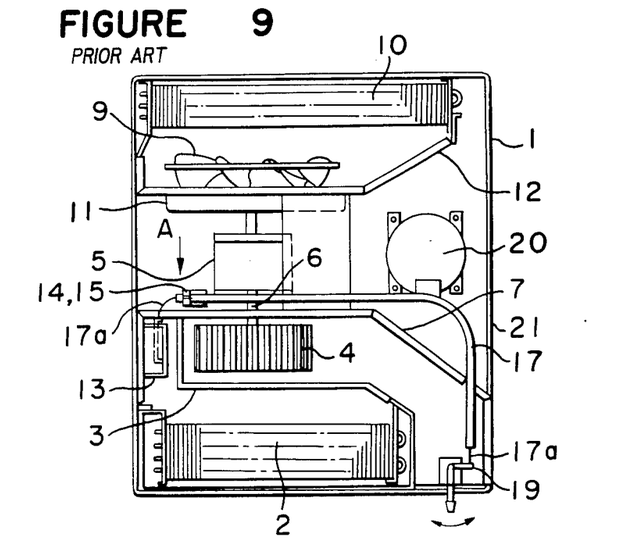
FIG. 9 is a cross-sectional view of an air conditioning apparatus in which a conventional damper device is installed.
Figure 10:
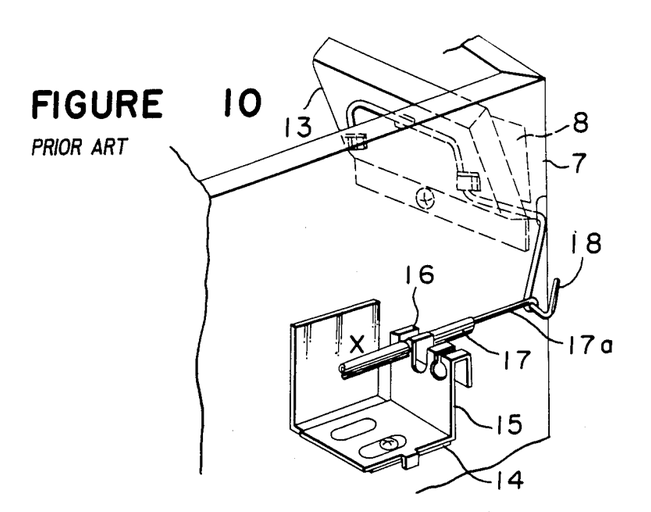
FIG. 10 is a perspective view in view of an arrow mark A in FIG. 9.

FIGS. 9 and 10 show a conventional damper device for an air conditioning apparatus disclosed in Japanese Examined Utility Model Publication No. 13555/1981.

The conventional air conditioning apparatus will be explained with reference to FIGS. 9 and 10.

A reference numeral 1 designates the main body of an air conditioning apparatus, a numeral 2 designates a cooling device placed in the room side of the air conditioning apparatus, a numeral 3 designates a casing placed in the rear of the cooling device 2, and a numeral 4 designates a fan at the room side which is placed in the casing 3 and is connected to the rotary shaft 6 of a motor 5. An intermediate partition plate 7 is positioned in the main body of the air conditioning apparatus 1 to separate the room side from the outdoor side and forms a room side air passage in association with the casing 3. An intake opening 8 is formed in the intermediate partition plate 7 to suck air into the room side air passage. A fan 9 is provided at the outdoor side of the air conditioning apparatus 1 and is connected to the rotary shaft 6. A condenser 10 is provided in the rear of the outdoor side fan 9. Numerals 11 and 12 respectively designate a bellmouth and a fan cover which form an outdoor side air passage. An intake damper 13 is provided in the vicinity of the air intake opening 8 so as to be oscillatable. The intake damper 13 is secured to the intermediate partition plate 7 by screws and undergoes opening and closing movement by operating a cable which will be described later. A numeral 14 designates a fixing metal having an L-shape in cross section which is attached to the intermediate partition plate 7 near the intake opening 8 by welding, a numeral 15 designates a cable fitting plate fixed to the fitting metal 14 by a screw, the cable fitting plate 15 being provided with a recess 16 at its upper end portion, a numeral 17 designates a cable which is supported by the recess 16 in the fixing metal 15 and has a wire 17a connected to a damper wire 18 of the intake damper 13 and a lever 19 respectively. Numerals 20 and 21 designate a compressor and a base plate.

In the conventional damper device, when the lever 19 is turned in either direction, the intake damper 13 is opened or closed by forwarding or retracting movement of the cable 17 whereby the degree of opening of the intake opening 8 is changed and an amount of air sucked is adjusted.

In the air conditioning apparatus, a refrigerant is supplied to the compressor 20 to be high temperature and high pressure refrigerant, and thereafter, the refrigerant is passed in the condenser 10 where it is cooled and liquefied by the outdoor side fan 9. When it is passed through the cooling device 2, there takes place evaporation by taking heat from the refrigerant by means of the room side fan 4. During evaporation of the refrigerant, the sucked air is cooled and discharged in a room through an outlet port of the air conditioning apparatus 1 after having been passed through the casing 3.

In the conventional damper device of the air conditioning apparatus, however, it is necessary to separately prepare a damper wire 18 as a cable-wire connecting part. Accordingly, the number of parts increases and operations to assemble the damper device becomes complicated. Further, since the conventional damper device is such construction that the intake damper 13 is oscillatably provided in the vicinity of the intake opening 8 by a hinge so that a part of the intake damper 13 is fixed, it is difficult to connect the intake damper 13 to the duct, in a case that air has to be supplied to a location away from the intake damper 13 by means of a duct.

Further, in the conventional damper device for an air conditioning apparatus, the cable is secured by the cable fixture. However, since there is no standard to determine a position in the longitudinal direction of the cable at a given position, there occurs fluctuation in the position to be fixed and it is impossible to fix the cable at a predetermined position. This results in unevenness of the degree of the opening and closing movement of the damper.

It is an object of the present invention to provide a damper device for an air conditioning apparatus which simplifies the construction of the device as a whole and facilitates easy connection of the damper to the duct.

It is another object of the present invention to provide a damper device for an air conditioning apparatus which fixes a cable at a predetermined position with minimal fluctuation.

The damper device for an air conditioning apparatus of the present invention comprises a damper for adjusting an air flow rate which has a duct connected to an air communicating port of the main body of the air conditioning apparatus and having a slit opened at the side of the duct, and an opening and closing part inserted in the duct through the slit to open and close the air communicating port, and a pivotal shaft turnably supported by the duct and provided with a cable-wire connecting part in one piece.

In the present invention, the cable-wire connecting part is formed integrally with the damper. Accordingly, the number of parts can be reduced and assembling operations for fitting the parts can be simplified. Since the duct has the slit opened at the side of the duct, the damper comprises the opening and closing part inserted in the duct through the slit to open and close the air communicating port and the pivotal shaft turnably supported by the duct, the damper can be easily connected to the duct by inserting it through the slit.

Another aspect of the present invention, the damper device comprises a duct for connecting an air passage formed in the main body of the air conditioning apparatus to an air communicating port, a damper for opening and closing the air communicating port to adjust an amount of air flowing through the duct, a cable for operating the damper which is connected to a cable-wire connecting part provided in a pivotal shaft of the damper by a wire, an engaging part formed in the cable, a cable supporting part formed integrally with the duct, a cable fixture for fixing the cable to the cable supporting part, and a member to be engaged which is provided in the cable fixture or the cable supporting part to be engaged with the engaging part.

In the present invention, the cable is fixed by the cable fixture after the member to be engaged is connected to the engaging part so that a position of the cable is determined by the engagement of the engaging part with the member to be engaged. Accordingly, the cable can be always fixed at a predetermined position as far as the position of the engaging part of the cable is constant.

Preferred embodiments of the present invention will be described with reference to the drawings.

Figure 1:
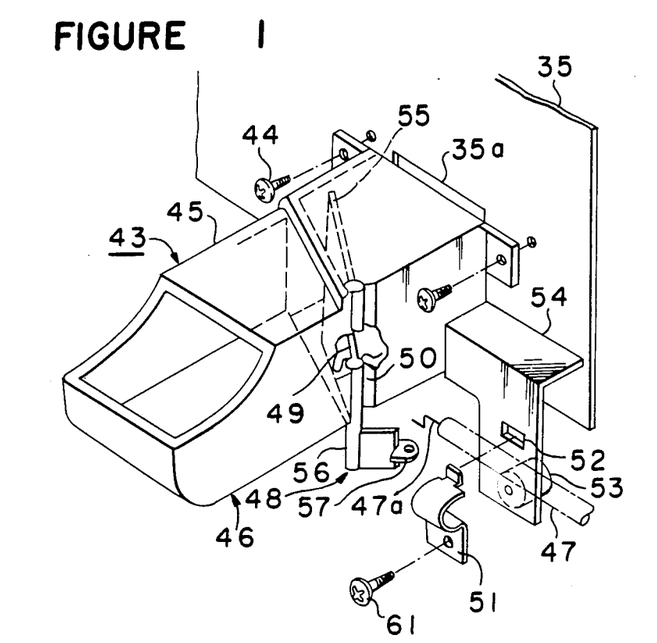
FIG. 1 is a perspective view partly disassembled of an embodiment of the damper device for an air conditioning apparatus according to the present invention.
Figure 2:
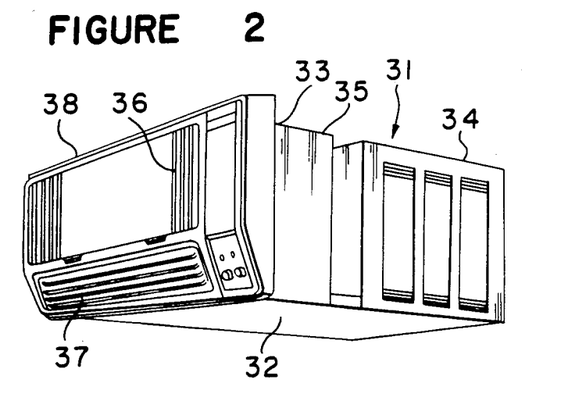
FIG. 2 is a perspective view of an embodiment of the integral type air conditioning apparatus in which a damper device of the present invention is installed.
Figure 3:
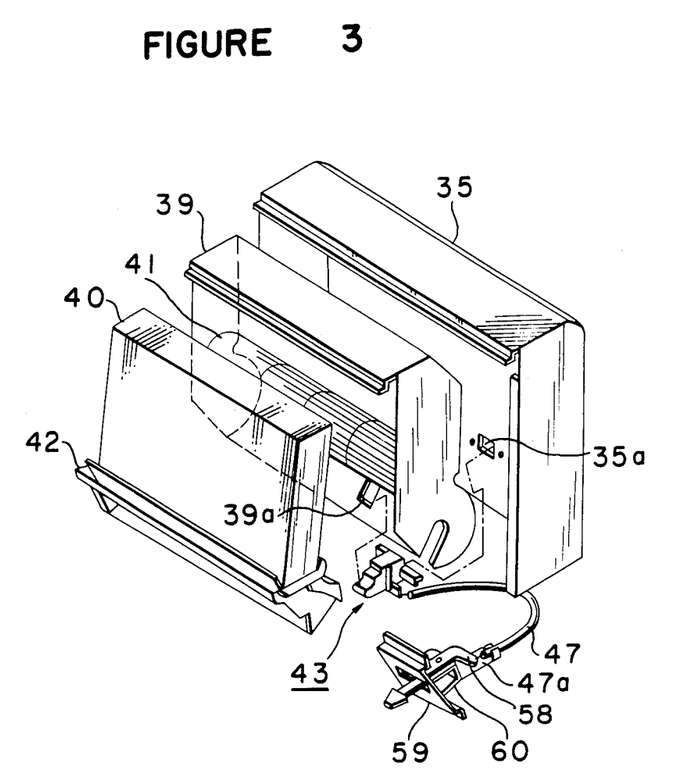
FIG. 3 is a perspective view in a disassembled state of an embodiment of the room side section of the air conditioning apparatus in FIG. 2.

In FIGS. 1 to 3, a main body 31 of an air conditioning apparatus comprises a room side unit 33 and an outdoor side unit 34 which are placed on the base plate 32 with a predetermined distance. The main body 31 is partly inserted in an opening formed in a wall (not shown) and fixed to it.

A front panel 38 provided with an intake port 36 and an outlet port 37 at the front opening part is attached to a cabinet 35 placed in the room side unit 33. A casing 39 is provided in the cabinet 35 to form an air passage. In the casing 39, there is provided a cooling device 40 to cool air in a room and an air-blowing fan 41 driven by a motor (not shown). A discharge nozzle 42 is also provided in the casing 39 in the front of the air-blowing fan 41. On the other hand, there is provided an air-blowing fan (not shown), an condenser and a compressor and so on in the outdoor side unit 34. The condenser, the compressor and the cooling device 40 are connected by piping for refrigerant (not shown). An air communicating port 35a and a suction hole 39a are respectively formed in the cabinet 35 and the casing 39. Thus an air circulating part is constituted by the above-mentioned elements. A damper device 43 is provided between the air communicating port 35a and the suction hole 39a. The damper device 43 is secured to the cabinet 35 by means of screws 44. The damper device 43 is provided with a duct 46 consisting of a tubular duct body 45 which is communicated with the air communicating port 35a and the suction hole 39a and a damper for opening and closing the air communicating port 35a by advancing and retracting movement of a cable 47 for opening and closing the damper whereby an amount of air is adjusted. The duct body 45 has an open end at the air intake side which is formed to have a curved portion in conformity with the shape of the discharge nozzle 42 and a recess 50 adapted to receive a rotary shaft is formed in the side surface of the duct body 45, the recess 50 being provided with a slit 49 opened in the side surface.

A cable supporting part 54 is extended from the side surface of the duct body 45. The cable supporting part 54 has a rectangular hole 52 to receive a fixture 51 and a fitting boss 53. The damper 48 is provided with an opening and closing part 55 which is inserted in the duct body 45 through the slit 49 to open and close the air communicating port 35a and a pivotal shaft 56 supported in the recess 50 formed in the duct 46 in a freely turnable manner. A cable-wire connecting part 57 is formed integrally with the pivotal shaft 56 so as to connect a wire of the cable 47. A hooked damper lever 58 is pivoted in a freely rotatable manner by a lever supporting part 60 fixed to an operating plate 59. The hooked damper lever 58 has an end inserted into the operating plate 59 and the other end connected to the wire 47a of the cable 47. A reference numeral 61 designates a fitting screw for connecting the fixture 51 to the cable supporting part 54.

In the damper device for an air conditioning apparatus having the construction as above-mentioned, since the cable-wire connecting part 57 is formed integrally with the damper 48, the number of parts can be reduced and assembling operations can be simplified due to smaller number of parts. Further, the duct 46 has the slit 49 opened at the side surface of the duct, and the damper 48 has the opening and closing part 55 which is inserted in the duct body 45 through the slit 49 to open and close the air communicating port 35a and the pivotal shaft 56 pivotally supported in the recess 59 formed in the duct body 45. Accordingly, connection of the damper 48 to the duct 46 can be merely carried out by inserting the opening and closing part 55 into the duct body 45 through the slit 49. Namely, the damper 48 is connected to the duct 46 by inserting the opening and closing part 55 in the duct body 45 through the slit 49 and the pivotal shaft 56 is forcibly fitted into the recess 50.

Figure 4:
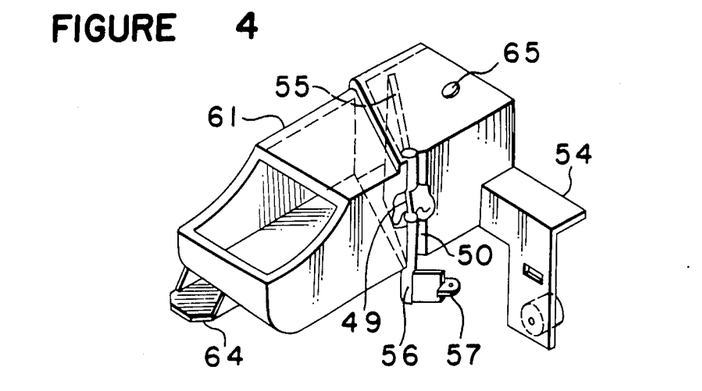
FIG. 4 is a perspective view showing the second embodiment of the damper device for an air conditioning apparatus.
Figure 5:
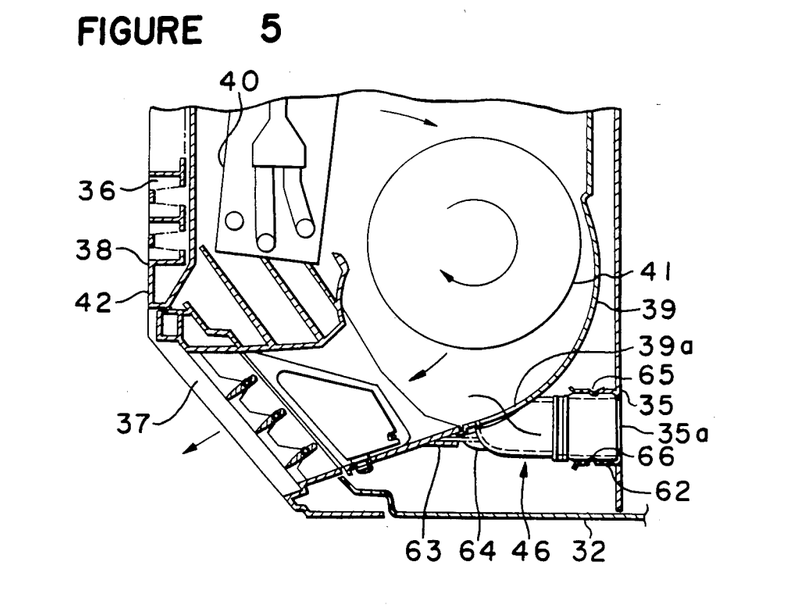
FIG. 5 is a cross sectional view showing how the damper device of the present invention is assembled in the air conditioning apparatus.

In the above-mentioned embodiment, the duct body 45 is fixed to the cabinet 35 by means of the screws 44. However, the present invention is not limited to this embodiment, but it is possible to hold a duct body 61 by an spring action as shown in FIGS. 4 and 5. Namely, the duct body 61 is held by a channel-shaped duct supporting piece 62 attached in the vicinity of the opening of the air communicating port 35a and a projecting rib 63 formed below the discharge nozzle 42. The holding of the duct 61 is carried out by flexible deformation of the duct supporting piece 62 and the projecting rib 63. In this case, it is preferable that the duct body 61 is provided with a tongue piece to be engaged with the projecting rib 63 and at least one cavity 65 at the opposite side with reference to the tongue piece 64 so that a raised portion 66 formed in the duct supporting piece 62 is fitted to the cavity 65.

In the above-mentioned embodiment, the recess 50 adapted to turnably receive the entirety of the pivotal shaft 56 of the damper 48 is formed in the duct 46. However, it is possible to form extensions each having a pivotal hole to which upper and lower ends of the pivotal shaft 56 are supported are formed at the upper and lower parts of the duct body 45.

Further, in the above-mentioned embodiment, description has been made as to damper device used for sucking air. However, the damper device of the present invention can be useful for discharging air, and it is applicable to any type of air conditioning apparatus.

In accordance with the embodiment described above, since the cable-wire connecting part is formed integrally with the damper, elements for fitting a cable to a damper required in the conventional device becomes needless thereby reducing the number of parts. Accordingly, the construction of the damper device can be simplified and assembling operations for the damper device can be improved. Further, the duct has a slit opened in the side surface and the damper is provided with an opening and closing part inserted in the duct through the slit and a pivotal shaft turnably supported by the duct, whereby connection of the damper to the duct can be easy. The construction of the damper device is useful when a position where air is sucked and dishcarged is away from the damper and the air has to be introduced by mean of a duct.

Figure 6:
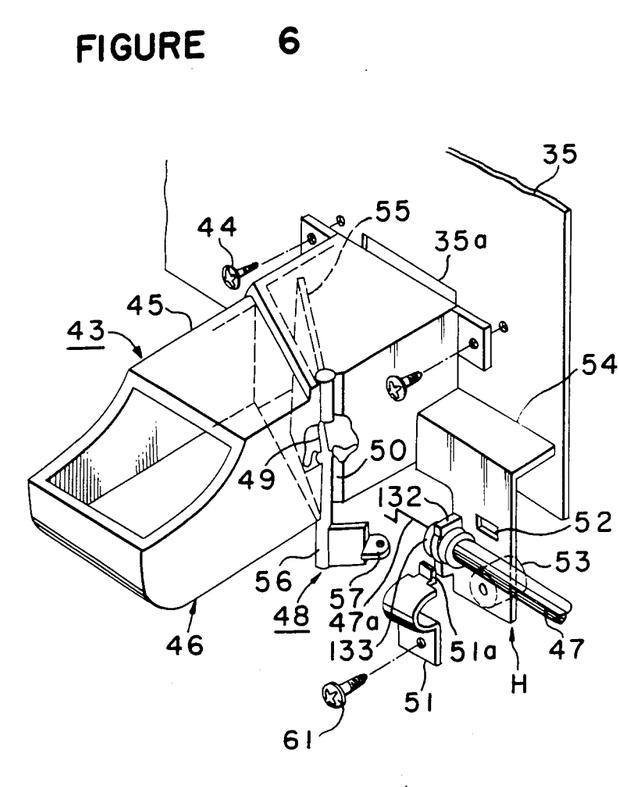
FIG. 6 is a perspective view partly disassembled of the third embodiment of the present invention.
Figure 7:
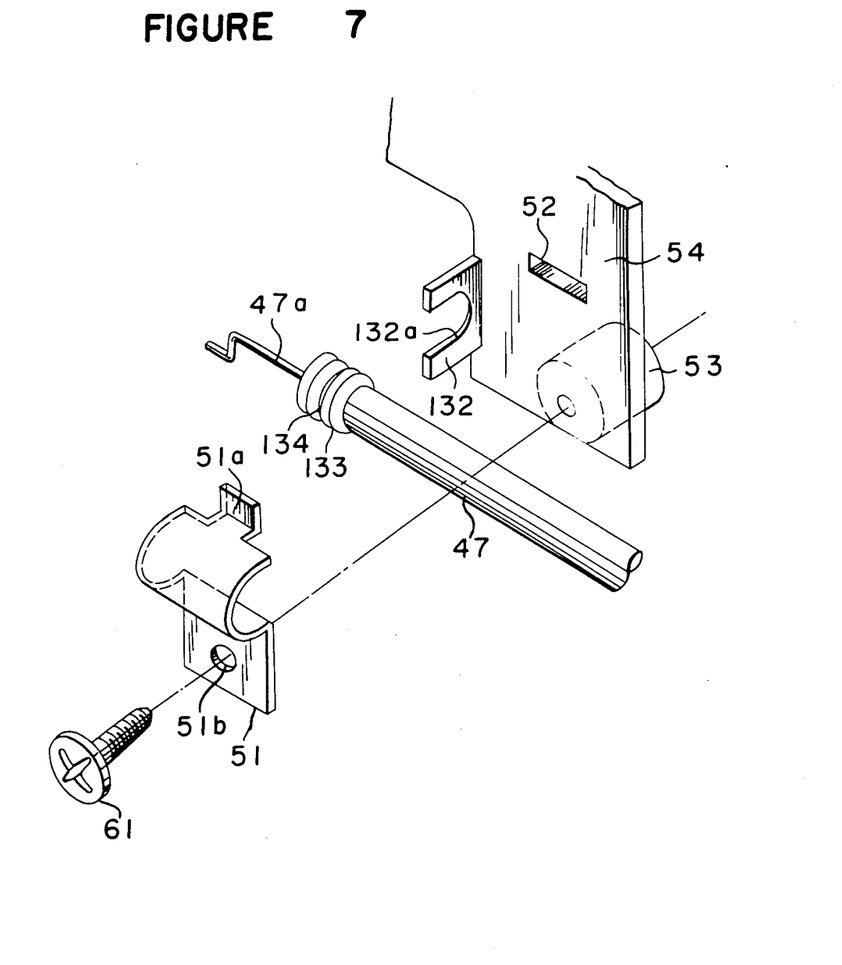
FIG. 7 is a perspective view in a disassembled state of an important part of the damper device shown in FIG. 3.

FIGS. 6 and 7 show the third embodiment of the present invention.

In FIGS. 6 and 7, the same reference numerals as in FIGS. 1 to 5 designate the same or corresponding parts. A reference numeral 132 designates a member to be engaged which is formed integrally with a cable supporting part 54. The member 132 to be engaged has a U-shaped recess 132a with which a cable 47 is engaged by means of an annular groove 134 formed in an engaging part 133 at the end of the cable 47 so that the cable 47 is fixed at a predetermined position in the air conditioning apparatus.

In such case that the cable 47 is fixed to the cable supporting part 54, firstly the wire 47a of the cable 47 is connected to cable-wire connecting part 57 of the damper 48, the annular groove 134 formed in the engaging part 133 of the cable 47 is fitted to the U-shape recess 132a of the member to be engaged 132. Then, the cable fixture 51 is fastened to the cable supporting part thereby securing the cable 47. When the cable fixture is fastened to the cable supporting part, a pawl 51a is hooked to a rectangular hole 52 formed in the cable supporting part 54, and a screw 61 is screwed in the fitting boss 53 attached to the cable supporting part 54 through a threaded hole 51b formed in the lower part of the cable fixture 51.

In the above-mentioned embodiment, the engaging part 133 is provided at a predetermined location of the cable 47 and the member to be engaged 132 is provided on the cable supporting part 54. Accordingly, in assembling operations, the cable 47 can be always fixed at a predetermined position merely by engaging the engaging part 133 with the member to be engaged 132, whereby the cable can be always fixed at a predetermined position.

Figure 8:
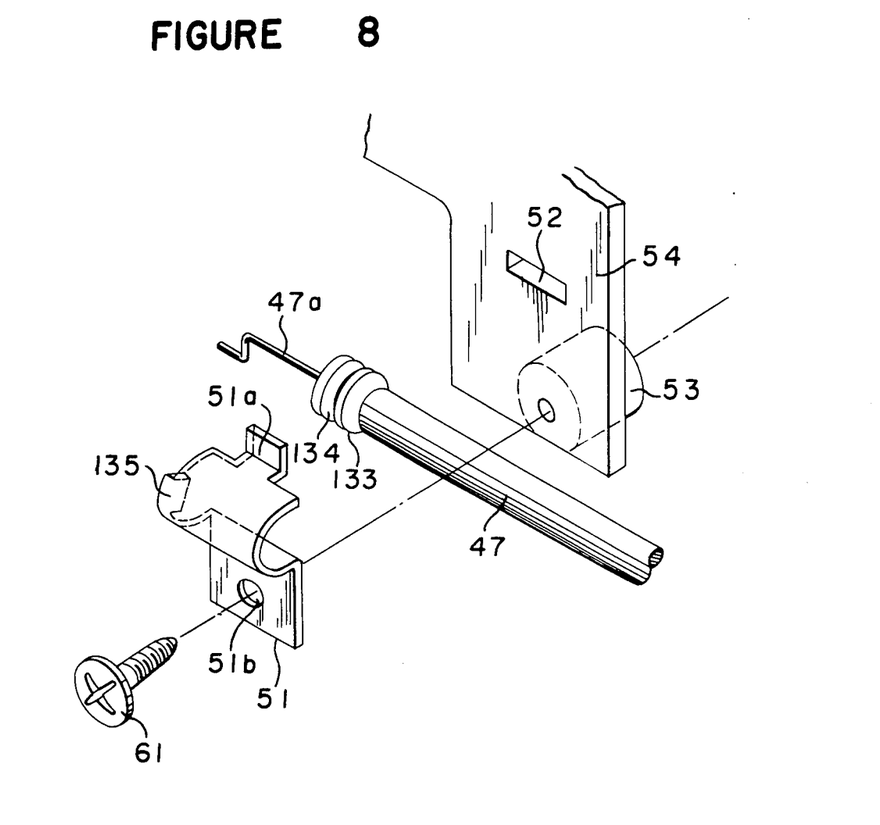
FIG. 8 is a perspective view in a disassembled state of the fourth embodiment of the present invention.

FIG. 8 shows the fourth embodiment of the present invention.

In the fourth embodiment, a member to be engaged 135 which corresponds to the member to be engaged 132 in the third embodiment is provided in the cable fixture 51.

The member to be engaged 135 is so formed that when the cable fixture 51 is attached to the cable supporting part 54, the member 135 is just engaged with an annular groove 134 formed in the engaging part 133 of the cable 47. The engaging means in the fourth embodiment provides substantially same as that in the third embodiment. However, in the fourth embodiment, a metal mold for the duct body 45 can be simplified and the manufacturing cost of the mold can be low since the member to be engaged 132 is not provided in the cable supporting part 54.

In the third and fourth embodiments of the present invention, a damper device for an air conditioning apparatus enabling the cable to fix at a predetermined position without fluctuation of position is obtainable.

We claim:

1. A damper device for an air conditioning apparatus provided with an internal air circulating part adapted to suck room air to pass it in a heat exchanger thereby effecting heat exchanging and to discharge the heatexchanged air into a room, characterized by comprising
   (a) a duct for communicating said air circulating part with the exterior of said air circulating part, said duct being provided in its side wall with a slit having a predetermined length and a recess adapted to receive a pivotal shaft, and
   (b) a damper placed in said duct to adjust an air flow rate between said air circulating part and the outside of the air conditioning apparatus, said damper comprising an opening and closing part extending in said duct through said slit so as to open and close said duct, a shaft member which is formed at one end of said opening and closing part and which is pivotally supported in said recess, and a cable connecting part to which a cable to operate said shaft member is connected.

2. A damper device for an air conditioning apparatus according to claim 1, wherein said duct has its one open end attached to a wall constituting a part of said air circulating part by a connecting means and the other open end attached to the body of the air conditioning apparatus by a supporting member, said connecting means comprising a rib projecting from said wall and a tongue projecting from said duct near said one open end to thereby engage with said projecting rib, and said supporting member comprising a pair of duct supporting pieces to grasp said duct near said other open end.

3. A damper device for an air conditioning apparatus according to claim 2, wherein at least one depression is formed in the outer surface of said duct at a position facing said duct supporting pieces, and a raised portion is formed in each of said duct supporting pieces to engage with said depression.

4. A damper device for an air conditioning apparatus according to claim 1, wherein said cable has an end portion supported by a cable supporting part placed in the main body of the air conditioning apparatus; a first engaging member to engage with said cable is provided on said cable supporting part; and a second engaging member which is engaged with said first engaging member to hold said cable at a predetermined position is provided at said end portion of the cable.

5. A damper device for an air conditioning apparatus according to claim 4, wherein said cable supporting part is formed integrally with said duct and is in the vicinity of said cable connecting part.

6. A damper device for an air conditioning apparatus according to claim 1, wherein said end portion of the cable is clamped between said cable supporting member placed in the main body of the air conditioning apparatus and a cable fixture; a first engaging part is formed in a predetermined portion of said end portion of the cable; and a second engaging part which is engaged with said first engaging part to hold said end portion of the cable at a predetermined position is provided in said cable fixture.

* * * * *